(12) United States Patent
Jenneve et al.

(10) Patent No.: US 12,160,266 B1
(45) Date of Patent: Dec. 3, 2024

(54) SYSTEMS AND METHODS OF COMPENSATING FOR FREQUENCY OFFSETS IN OPTICAL COMMUNICATIONS

(71) Applicant: Cisco Technology, Inc., San Jose, CA (US)

(72) Inventors: Philippe Jenneve, Rosheim (FR); Bernd Huebner, Mountain View, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 10 days.

(21) Appl. No.: 17/883,961

(22) Filed: Aug. 9, 2022

(51) Int. Cl.
*H04B 10/61* (2013.01)
*H04B 10/118* (2013.01)

(52) U.S. Cl.
CPC ......... *H04B 10/118* (2013.01); *H04B 10/615* (2013.01); *H04B 10/6164* (2013.01)

(58) Field of Classification Search
None
See application file for complete search history.

(56) References Cited

U.S. PATENT DOCUMENTS

| | | | | |
|---|---|---|---|---|
| 8,909,069 B2 * | 12/2014 | Roberts | ............... | H04B 10/6162 398/208 |
| 8,913,636 B2 * | 12/2014 | Roos | ....................... | H01S 5/141 372/12 |
| 9,203,508 B2 * | 12/2015 | Hauske | .................. | H04B 10/07 |
| 9,450,680 B2 * | 9/2016 | Sakai | ...................... | H04B 10/63 |
| 9,525,494 B2 * | 12/2016 | Ogiwara | ............. | H04B 10/6164 |
| 9,628,316 B2 * | 4/2017 | Yi | .......................... | H04B 10/615 |
| 9,647,767 B2 * | 5/2017 | Guo | ..................... | H04B 10/6161 |
| 9,935,720 B2 * | 4/2018 | Fludger | ............... | H04B 10/6164 |
| 9,941,974 B2 * | 4/2018 | Yu | ......................... | H04B 10/612 |
| 10,075,256 B2 * | 9/2018 | Magri | .................. | H04J 14/0227 |
| 10,439,732 B2 * | 10/2019 | Oyama | .............. | H04B 10/6165 |
| 10,615,879 B1 * | 4/2020 | Lee | ..................... | H04B 10/2513 |
| 10,958,338 B2 * | 3/2021 | Mehrvar | ................ | H04B 10/03 |
| 11,070,294 B2 * | 7/2021 | Suhr | ................... | H04B 10/6161 |
| 11,128,383 B2 * | 9/2021 | Gupta | ................. | H04B 10/6164 |

(Continued)

OTHER PUBLICATIONS

Petersen, Julie K., Fiber Optics: Illustrated Dictionary, CRC Press, 2003 (Year: 2003).*
Medhi, Von Neumann Architecture, 2012 (Year: 2012).*

Primary Examiner — Jai M Lee
(74) Attorney, Agent, or Firm — K&L GATES LLP

(57) ABSTRACT

A system and method for compensating a frequency shift of an optical communication signal may include a tunable receiver laser, a coherent optical receiver that receives the optical communication signal, in which the coherent optical receiver can demodulate the optical communication signal based on an optical output of the tunable receiver laser, a trans-impedance amplifier that receives a demodulated signal from the coherent optical receiver and generates an amplifier output, a laser tracking system that generates a laser tuning signal configured to adjust the optical output of the tunable receiver laser, and a controller including a processor and a memory unit. The memory unit includes instructions that cause the controller to receive the amplifier output, calculate a frequency spectrum of the amplifier output, and determine an offset of a frequency of the optical communication signal from a first frequency of the optical output.

16 Claims, 6 Drawing Sheets

(56) References Cited

U.S. PATENT DOCUMENTS

| | | | | |
|---|---|---|---|---|
| 11,621,783 B2* | 4/2023 | Koga | ............... | H04B 10/6151 |
| | | | | 398/65 |
| 11,811,460 B2* | 11/2023 | Razzell | ............. | H04B 10/6162 |
| 2012/0057884 A1* | 3/2012 | Zhao | .................... | H04B 10/63 |
| | | | | 398/209 |
| 2014/0328588 A1* | 11/2014 | Sakai | ............... | H04B 10/6164 |
| | | | | 398/140 |
| 2021/0075517 A1* | 3/2021 | Matsuda | ............... | H04B 10/61 |
| 2023/0224045 A1* | 7/2023 | Shigeta | ........... | H04B 10/07955 |
| | | | | 398/38 |

\* cited by examiner

SYSTEMS AND METHODS OF COMPENSATING FOR FREQUENCY OFFSETS IN OPTICAL COMMUNICATIONS

FIELD

This disclosure relates generally to the field of communication using laser light transmission.

BACKGROUND

Contemporary optical communications and other photonic systems make extensive use of photonic integrated circuits that are advantageously mass-produced in various configurations for various purposes.

SUMMARY

In part, in one aspect, the disclosure relates to a system for compensating a frequency shift of an optical communication signal. The system may include a tunable receiver laser, a coherent optical receiver configured to receive the optical communication signal, a laser tracking system configured to generate a laser tuning signal configured to adjust the optical output of the tunable receiver laser, and a controller that includes a processor and a memory unit. The coherent optical receiver may be configured to demodulate the optical communication signal based on an optical output of the tunable receiver laser. The memory unit may further include instructions that, when executed by the controller, cause the controller to receive the amplifier output, calculate a frequency spectrum of the amplifier output, and determine an offset of a frequency of the optical communication signal from a first frequency of the optical output.

In many embodiments, the optical communication signal is transmitted from a communication satellite. In some embodiments, the trans-impedance amplifier further includes a power monitor configured to generate a power level based on the demodulated signal. In various embodiments, the laser tracking system is configured to generate the laser tuning signal when a value of the power level is less than or equal to a threshold. In some embodiments, the tuning signal is configured to adjust the optical output in a step-wise manner.

In various embodiments, the laser tracking system is configured to generate the laser tuning signal based on a spectral centroid of the frequency spectrum of the amplifier output when a value of the power level is greater than a threshold. In some embodiments, the tuning signal is configured to adjust the optical output within a range of about 5 GHz to about 10 GHz. In some embodiments, the memory unit may further include instructions that, when executed by the controller, cause the controller to calculate the frequency spectrum of the amplifier output based on a Fast Fourier Transform algorithm. In various embodiments, the frequency shift of the received optical communication signal is a Doppler shift. In many embodiments, the first frequency of the tunable receiver laser is a spectral centroid frequency.

In part, in one aspect, the disclosure relates to a method for compensating a frequency shift of a received optical communication signal. The method may include receiving, by a coherent optical receiver, the optical communication signal, demodulating, by the coherent optical receiver, the optical communication signal based on an optical output of a tunable receiver laser, thereby generating a demodulated signal, generating, by a trans-impedance amplifier, an amplifier output based on the demodulated signal from the coherent optical receiver, generating, by a laser tracking system, a laser tuning signal, adjusting, by the laser tracking system, the optical output based on the laser tuning signal, receiving, by a controller, the amplifier output, calculating, by the controller, a frequency spectrum of the amplifier output, and determining, by the controller, an offset of a frequency of the optical communication signal from a first frequency of the tunable receiver laser.

In various embodiments, the method may include adjusting, by the laser tracking system, the optical output over a range of an optical communication band. In some embodiments, adjusting the optical output over a range of an optical communication band may include adjusting the optical output over a range of an optical communication C band, an optical communication O band, or an optical communication L band. In some embodiments, the method may include generating, by a power monitor, a power level based on the demodulated signal. In various embodiments, generating the laser tuning signal may include generating a tuning signal based when a value of the power level is less than or equal to a threshold. In some embodiments, adjusting, by the laser tracking system, the optical output, may include adjusting the optical output in a step-wise manner.

In various embodiments, generating the laser tuning signal may include generating a laser tuning signal based on a spectral centroid of the frequency spectrum of the amplifier output when a value of the power level is greater than a threshold. In some embodiments, adjusting the first frequency of the tunable receiver laser, may include adjusting the optical output within a range of about 5 GHz to about 10 GHz. In various embodiments, the method may include calculating, by the controller, the frequency spectrum of the amplifier output based on a Fast Fourier Transform algorithm. In many embodiments, the method mat include maintaining, by the laser tracking system, the first frequency of the tunable receiver laser at a predetermined value when a spectral centroid of the frequency spectrum of the amplifier output is within a predetermined range.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation. Further, the various apparatus, optical elements, coatings, layers, optical paths, waveguides, splitters, couplers, combiners, electro-optical devices, inputs, outputs, ports, channels, components and parts of the foregoing disclosed herein can be used with any laser, laser-based communication system, waveguide, fiber, transmitter, transceiver, receiver, and other devices and systems without limitation.

These and other features of the applicant's teachings are set forth herein.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which.

DETAILED DESCRIPTION

In space, the communication between satellites can use different technologies, such as free space optical communication systems. These systems can be based on coherent optical modules.

Coherent modules require to have a receiver laser set at an optical frequency close enough to the central frequency of the received optical signal. The receiver laser is used as a local oscillator to down convert the received optical signal into the electrical base band. The spectral centroid frequency of the receiver laser may not be perfectly aligned with the central frequency of the received optical signal, leading to a so called "frequency offset" impacting the reception quality of the optical signal. A digital signal processing (DSP) unit may be used to correct for the frequency offset within a certain frequency range.

In space, due to the relative displacement of the satellites, the transmitted optical signal can be impacted by an optical Doppler shift resulting in a translation in frequency, that is, a frequency offset of the optical signal that can vary over time at the receiver. This frequency offset can be significant depending on the amount of Doppler shift—that is, change in frequency due to the relative speed between satellites—exceeding the DSP frequency compensation range and the receiver electrical bandwidth. This issue can affect the receiver performance. In some aspects, if the demodulated receive optical signal is completely out of the receiver bandwidth, the system may not be able to recover the transmitted signal. In part, the disclosure is directed to systems and methods that may be used to overcome significant Doppler shift of the received optical signal. In some embodiments, the Doppler shift-based problems may be resolved using a locking and tracking system and related methods. It may be understood that other effects may result in an offset frequency in the received optical signal. In one alternative aspect, the transmitting laser used to create the received optical signal may be unstable or otherwise suffer from frequency shift (such as from an inhomogeneity in the lasing medium).

Figure 1:
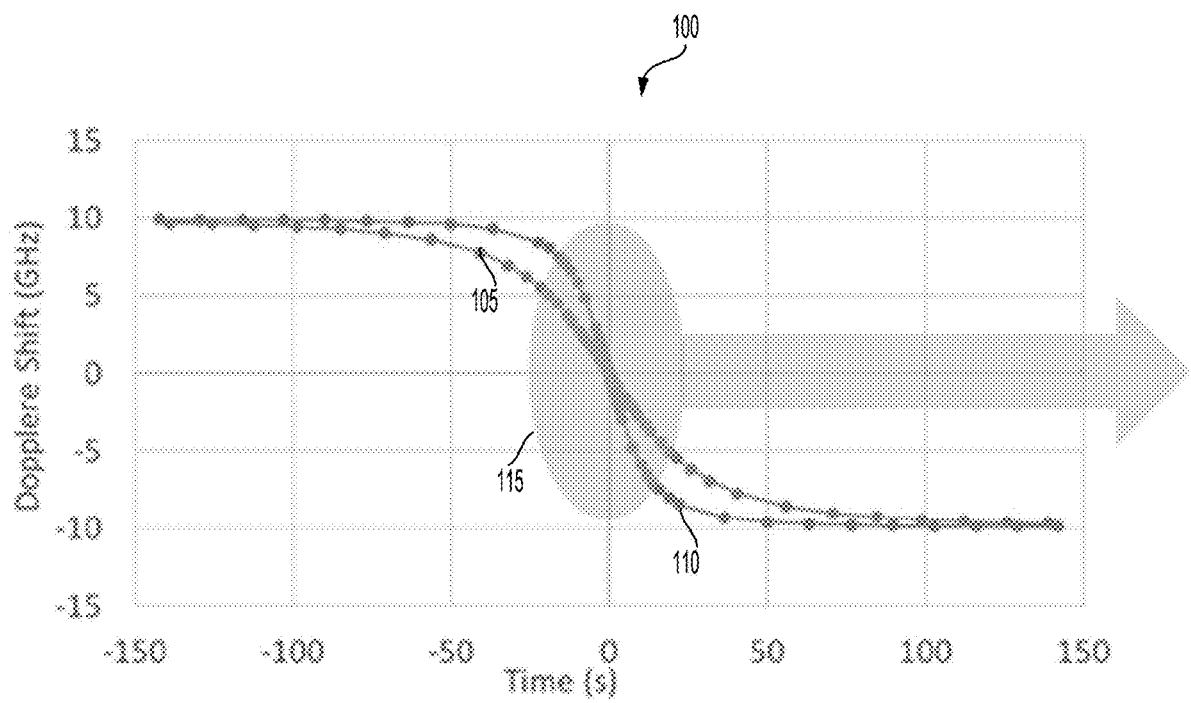
FIG. 1 is a graph of a Doppler shift of an optical signal according to an exemplary embodiment of the disclosure.

Refer now to the example embodiment of FIG. 1. FIG. 1 is a graph 100 depicting the effect of Doppler shift on an optical signal received by a satellite. One branch of the graph illustrates a worst case Doppler shift of a signal for a satellite having a first orbital distance 105. A second branch of the graph illustrates a worst case Doppler shift of a signal for a satellite having a second orbital distance 110. In some aspects, the first orbital distance may be greater than the second orbital distance. It can be observed that the frequency of the transmitting satellite is blue shifted (positive Doppler shift) as the transmitting satellite approaches the receiving satellite. Alternatively, the frequency of the transmitting satellite is red shifted (negative Doppler shift) as the transmitting satellite recedes away from the receiving satellite. As disclosed above, presently DSP algorithms may be capable of correcting for minor Doppler shifts 115 in the central frequency of the received optical signal. However, Doppler shifts outside of this frequency range may be outside the capabilities of the DSP correction algorithms. Thus, alternative methods may be required to make such corrections.

Figure 2:
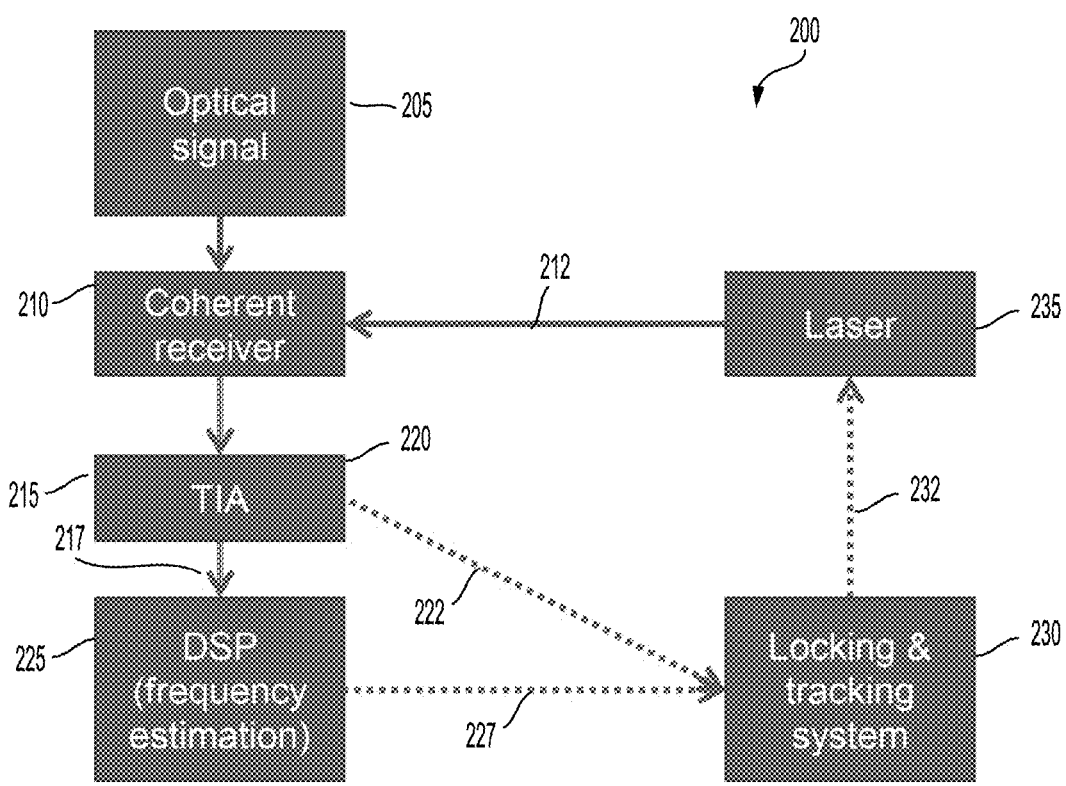
FIG. 2 is block diagram of components and a method for demodulating a received optical communication signal according to an exemplary embodiment of the disclosure.

Refer now to the example embodiment of FIG. 2. FIG. 2 is a block diagram 200 of components and methods for demodulating a received optical communication signal 205 from a transmitting communication satellite. The received optical communication signal 205 may impinge on a coherent optical receiver 210. The coherent optical receiver 210 may be characterized by a bandwidth. In some aspects, the bandwidth of the coherent optical receiver 210 may be 10s of GHz and may have a value ranging between about 10 GHz to about 100 GHz. In some alternative aspects, the bandwidth of the coherent optical receiver 210 may exceed 100 GHz. The received optical communication signal 205 may represent an optical signal comprising a central frequency that is frequency modulated by a channel comprising communication data. In some non-limiting aspects, the central frequency of the received optical communication signal 205 may be within a frequency range characterizing an optical telecom C band. In alternative aspects, the central frequency of the received optical communication signal 205 may be within a frequency range characterizing an optical telecom L band, an optical telecom O band, or any other appropriate optical communication band. The received optical communication signal 205 is demodulated by the coherent optical receiver 210 based on the optical output 212 of a receiver laser 235 that may be characterized by a first frequency. In some non-limiting aspects, the first frequency may be a spectral centroid frequency of the receiver laser 235.

The demodulated signal generated by the coherent optical receiver 210 may be supplied to a trans-impedance amplifier 215. The trans-impedance amplifier 215 may generate an amplifier output 217 representing the demodulated received optical communication signal. The amplifier output 217 may serve as an input to a DSP algorithm 225. In some aspects, the DSP algorithm 225 may be stored in one or more memory units as instructions to be executed by a processor. The processor may include a general processor or a processor specifically designed to execute the DSP algorithm 225. In some aspects, the DSP algorithm 225 may calculate a frequency spectrum of the amplifier output.

During signal demodulation, the received optical communication signal 205 is demodulated by the optical output 212 of the receiver laser 235. If the spectral centroid frequency of the optical output 212 is identical to the central frequency of the received optical communication signal, the received optical communication signal is perfectly demodulated so that the spectral centroid of the frequency spectrum of the demodulated signal is at 0 Hz. The side-bands of the frequency spectrum contain the communication data of the received optical communication signal.

However, if the spectral centroid frequency of the optical output 212 is not identical to the central frequency of the received optical communication signal 205, the spectral centroid of the frequency spectrum of the demodulated signal is offset from about 0 Hz. If the offset is not large (see 115 at FIG. 1) the DSP algorithm 225 can successfully calculate the offset value, and the DSP algorithm 225 may be used to adjust the frequency of the frequency spectrum sidebands to recover the communication data. In the event that the offset frequency is outside the range of the DSP algorithm 225, an alternative method, disclosed herein, may be used to demodulate the received optical communication signal 205.

In the alternative method, receiver laser 235 may be a tunable receiver laser. A non-limiting example of the tunable receiver laser includes an integrated tunable laser assembly (ITLA). As a non-limiting example, the frequency range of the tunable receiver laser 235 may extend across the entire optical C band range, from about 196 THz to about 191 THz. It is understood that the optical output 212 of the tunable receiver laser 235 may extend across the entire bandwidth of other optical communication bands, as disclosed above. In some aspects, the tunable receiver laser 235 may have a fine tuning range of about 5 GHz to about 10 GHz. In some alternative aspects, the tunable receiver laser 235 may have a coarse tuning range over the complete optical communication band range in a step-wise manner. The step size may be chosen so that at least one stepped optical output 212 of the tunable receiver laser 235 will result in a demodulated output of the received optical communication signal 205 that lies within the bandwidth of the coherent optical receiver 210. In one non-limiting aspect, the steps may be in about 50 GHz increments although the step increments may have any appropriate value based on the criterion above.

As previously disclosed, the received optical communication signal 205 may be demodulated by the receiver laser 235, in this instance the tunable receiver laser 235, at the coherent optical receiver 210. The demodulated signal generated by the coherent optical receiver 210 may be supplied to the trans-impedance amplifier 215. The trans-impedance amplifier 215 may generate an amplifier output 217 representing the demodulated received optical communication signal. In one example, the trans-impedance amplifier 215 may also include a power monitor 220. Alternatively, the power monitor 220 may be a separate circuit from the trans-impedance amplifier 215. The power monitor 220 may receive the demodulated receiver optical communication signal and determine a power level of the demodulated receiver optical communication signal. In some non-limiting examples the power value may represent a root-mean-square (RMS) power value of the demodulated receiver optical communication signal. In the event that the spectral centroid frequency of the optical output 212 of the tunable receiver laser 235 is close or equal to the central frequency of the received optical communication signal 205, the demodulated received optical communication signal may include almost the full power of the frequency spectrum sidebands of the received optical communication signal 205. However, if the spectral centroid frequency of the optical output 212 of the receiver laser 235 is not close to the central frequency, the demodulated received optical communication signal may include a reduced power of the frequency spectrum sidebands of the received optical communication signal.

The power level may be used to determine if the spectral centroid frequency of the optical output 212 of the receiver laser 235 is close to or far from the central frequency of the received optical communication signal based on a comparison to a threshold value. In some non-limiting aspects, the threshold value may range between about 1% of the maximum signal power and about 10% of the maximum signal power, depending on the sensitivity of the coherent optical receiver 210 and the trans-impedance amplifier 215. If the power level is greater than the threshold value, the demodulated received optical communication signal may include nearly the full power of the side-bands of the received optical communication signal. The higher power level may be consistent with the spectral centroid frequency of the optical output 212 of the receiver laser 235 being close to the central frequency of the received optical communication signal 205. In such a case, the offset of the spectral centroid frequency of the output 212 of the receiver laser 235 from the central frequency of the received optical communication signal may be sufficiently small so that the DSP algorithm 225 can successfully determine the frequency offset and correct the frequency content of the side-bands. Thus, the amplifier output 217 may be directed to the DSP algorithm 225 as disclose above, for processing the demodulated received optical communication signal.

A DSP algorithm 225 may be used to determine the frequency offset between the spectral centroid frequency of the receiver laser 235 and the central frequency. Additional software may then be used to frequency-shift the side-bands of the demodulated signal to reconstruct the communication data of the received optical communication signal. It may be recognized that the accuracy of the reconstruction of the communication data is dependent on the accuracy of a determination the frequency offset between the spectral centroid frequency of the optical output 212 of the receiver laser 235 and the central frequency of the received optical communication signal. However, calculation errors, such a computational truncation errors, may result in imperfectly reconstructed communication data. Therefore, it may be useful to tune the optical output 212 of the receiver laser 235 to more closely match the central frequency of the received optical communication signal. In this manner, the reconstruction of the communication data may be less dependent on the accuracy of the DSP algorithm 225.

According to one aspect, the DSP calculated frequency offset between the spectral centroid frequency of the optical output 212 of the receiver laser 235 and the central frequency of the received optical communication signal may be supplied 227 to a laser tracking system 230. In various embodiments, the laser tracking system may be configured to perform one or more tracking and locking functions depending on a type of tracking control signal it receives (such as the central frequency of the received optical communication signal received from the DSP algorithm 225). The laser tracking system 230 may then generate a tuning signal 232 to control the spectral centroid frequency of the receiver laser 235. In this manner, the spectral centroid frequency of the optical output 212 of the receiver laser 235 may be adjusted to more closely match the central frequency of the received optical communication signal 205.

In some embodiments, this feedback system thus allows the tunable receiver laser 235 to track the central frequency of the received optical communication signal 205. As the spectral centroid frequency of the receiver laser 235 approaches the central frequency of the received optical communication signal 205, the frequency offset between the spectral centroid frequency of the optical output 212 of the receiver laser 235 and the central frequency of the received optical communication signal 205 decreases until the spectral centroid of the frequency spectrum of the demodulated signal is approximately 0 Hz or within an acceptable predetermined offset value. In some non-limiting aspects, the acceptable predetermined offset value may range between about 100 MHz and 1 GHz. The resulting side-bands may be used to reconstruct the communication data of the received optical communication signal without requiring any additional frequency shift calculations. In some non-limiting examples, the adjustment of the spectral centroid frequency of the receiver laser 235 may scan a fine tuning range of about 5 GHz to about 10 GHz.

Alternatively, if the power level is less than or equal to the threshold value, the demodulated received optical communication signal may represent the lower power of the sideband. This condition is consistent with the spectral centroid frequency of the optical output 212 of the receiver laser 235 being far to the central frequency of the received optical communication signal 205. Under such conditions, the DSP algorithm 225 may not be able to provide 227 a useful signal to the laser tracking system 230. Instead, the power level from the power monitor 220 may be provided 222 to the laser tracking system 230 as the tracking control signal. Thus, the laser tracking system 230 may generate a tuning signal 232 to control the spectral centroid frequency of the optical output 212 of the receiver laser 235 based on the power level from the power monitor 220. In this manner, the spectral centroid frequency of the optical output 212 of the receiver laser 235 may be adjusted to more closely match the central frequency of the received optical communication signal 205.

In some aspects, because the frequency offset between the spectral centroid frequency of the optical output 212 of the receiver laser 235 and the central frequency is sufficiently large, the adjustment of the spectral centroid frequency of the optical output 212 of the receiver laser 235 may step-wise scan over a coarse tuning range within the optical communication band range. In some non-limiting aspects, for example using a coherent optical receiver 210 having a bandwidth of about 100 GHz or greater, the steps may be in increments of about 50 GHz. This coarse tuning may continue until the spectral centroid frequency of the optical output 212 of the receiver laser 235 is sufficiently close to the central frequency of the received optical communication signal 205 so that the fine-tuning method, based on the DSP algorithm 225 and disclosed above, may take over the laser tuning process.

Once the spectral centroid frequency of the optical output 212 of the receiver laser 235 essentially matches the central frequency of the received optical communication signal 205, the system may maintain a frequency lock between the spectral centroid frequency of the optical output 212 of the receiver laser 235 and the central frequency of the received optical communication signal 205, making necessary corrections to the spectral centroid frequency of the optical output 212 of the receiver laser 235 as necessary.

Figure 3:
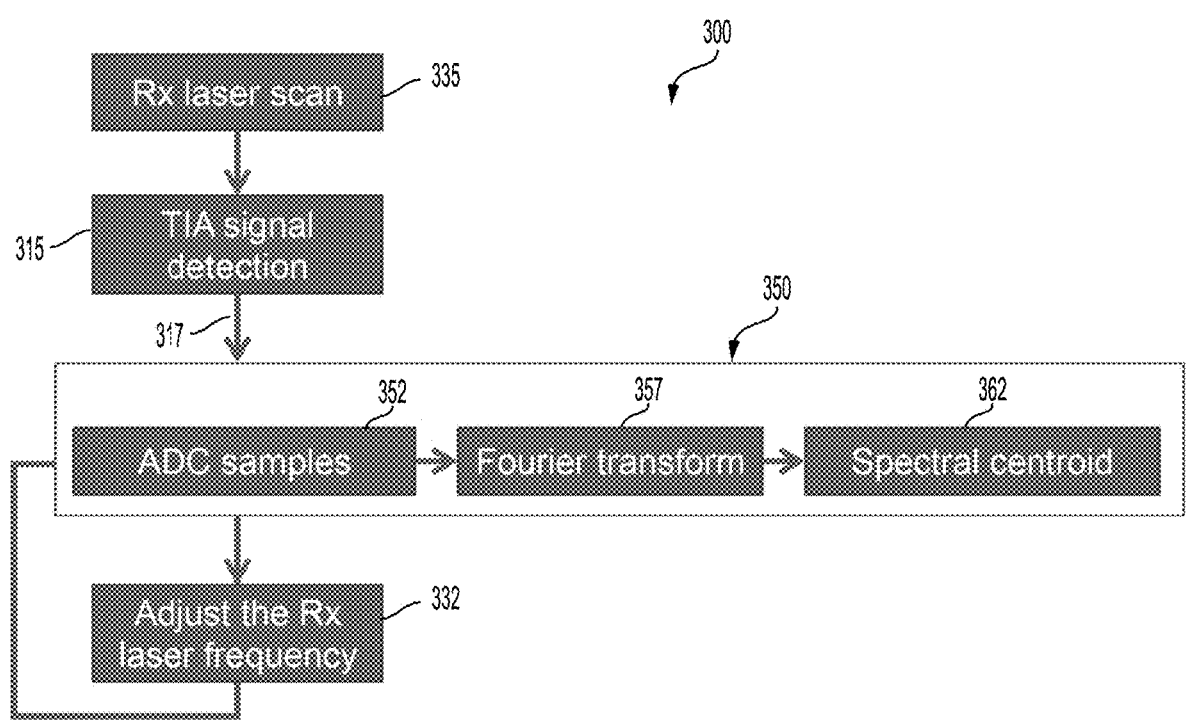
FIG. 3 is a block diagram of components and a method to generate a control signal of a scanning demodulation laser according to an exemplary embodiment of the disclosure.

Refer now to the example embodiment of FIG. 3. FIG. 3 is a block diagram 300 of components and a method to generate a control signal of a scanning demodulation laser. During the scanning operation of the tunable receiver laser 335, over the fine tuning range, the optical output 212 of the tunable receiver laser 235 is received by the coherent optical receiver 210 along with the received optical communication signal 205. The demodulated signal generated by the coherent optical receiver may be supplied to a trans-impedance amplifier 215, 315.

FIG. 3 further depicts the operation of the DSP algorithm during the fine tuning process. The amplifier output 217, 317 is sourced to a controller 350. The controller 350 may include an analog/digital converter 352 to convert the analog amplifier output 317 into digital values representing the analog amplifier output 217, 317. The digital output of the analog-digital converter 352 may be used by the DSP algorithm. The DSP algorithm may be embodied as software instructions in a memory unit of the controller 350 for use by a general processor, or as firmware instructions pre-programmed in a specialized DSP processor. The memory unit may also store the digital output until needed by the DSP processor. In one aspect, the DSP algorithm may include a Fast Fourier transform algorithm 357 to calculate the frequency spectrum of the amplifier output 317. The DSP algorithm may then calculate the spectral centroid of the frequency spectrum 362. The spectral centroid 362 may include information regarding the offset between the spectral centroid frequency of the optical output 212 of the receiver laser 235 and the central frequency of the received optical communication signal 205. The offset may then be used by the laser tracking system 230 to adjust 332 the optical output of the tunable receiver laser 235. The controller 350 may then continuously update the calculations of the spectral centroid of the frequency spectrum 362 as the optical output 212 the tunable receiver laser 235 scans in frequency.

Figure 4A:
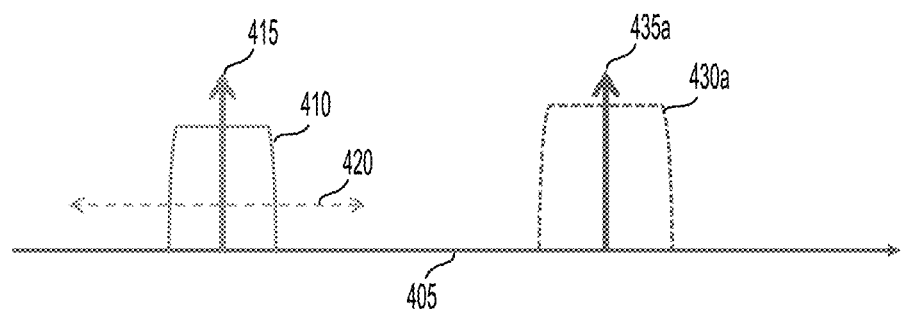
FIGS. 4A through 4E are diagrams depicting a shift in frequency of a demodulation laser to align with a central frequency of a received optical signal according to an exemplary embodiment of the disclosure.

Refer now to the example embodiments of FIGS. 4A-4E. FIGS. 4A-4E depict diagrams representing a shift in spectral centroid frequency of a tunable demodulation laser 235 to align with a central frequency of a received optical signal 205. FIG. 4A illustrates an initial condition of an envelope of a received optical communication signal 410 having a central frequency 415, and of the spectral centroid frequency 435a of the tunable receiver laser. The bandwidth of the coherent optical receive 430a is also depicted. The frequency difference between the central frequency 415 and the spectral centroid frequency 435a is depicted relative to frequency axis 405. It may be recognized that the received optical communication signal 410 may vary over time 420 due to frequency changes related to a Doppler shift.

It may be observed that FIG. 4A illustrates an initial condition in which there is no frequency overlap between the envelope of the received optical communication signal 410 and the bandwidth of the coherent optical receive 430a. As disclosed above, a power monitor value, based on the power of the received optical communication signal demodulated by the demodulation (tunable) laser, will be low when there is minimal overlap between the envelope of 410 and the bandwidth of the coherent optical receive 430a. Under this circumstance, the system and method disclosed above will generate a laser tuning signal based on the power of the demodulation signal from the power monitor. This may result in the tunable receiver laser being adjusted according to a coarse scanning process.

Figure 4B:
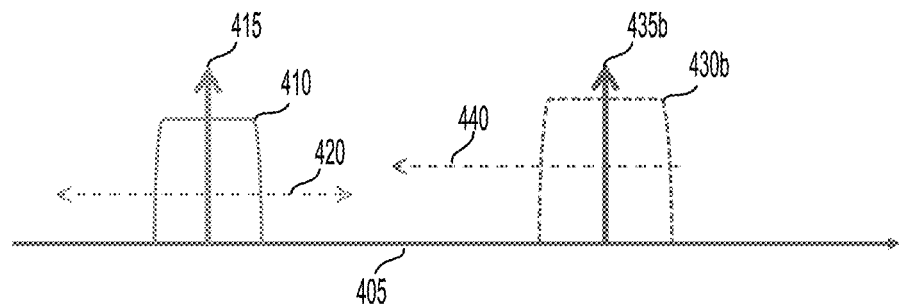

FIG. 4B illustrates the scanning of the spectral centroid frequency 435b of the tunable receiver laser during the coarse scanning process. The laser tuning signal causes the frequency of the spectral centroid frequency 435b of the tunable receiver laser to move 440 towards the central frequency 415. However, the bandwidth of the coherent optical receiver 430b still has no overlap with the envelope of the received optical communication signal 410.

Figure 4C:
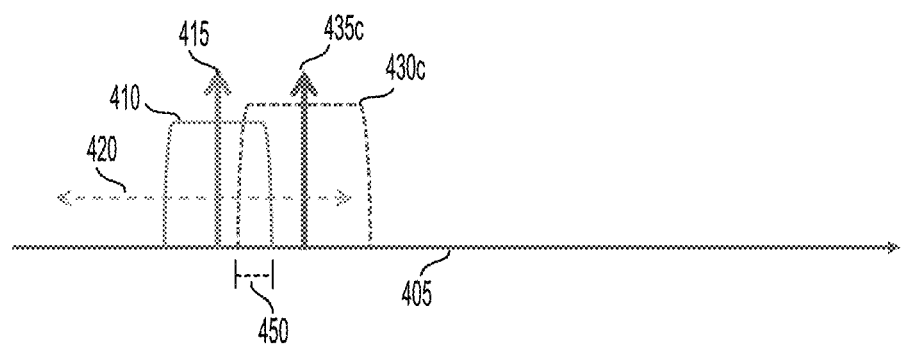

This coarse tuning adjustment of the tunable laser output may proceed in this manner until the condition depicted in FIG. 4C is obtained. FIG. 4C illustrates the condition in which a portion of the bandwidth of the coherent optical receiver 430c overlaps 450 the envelope of the received optical communication signal 410. At this point, demodulation of the envelope of the received optical communication signal 410 may result in a power level greater than the threshold at the power monitor. Although the spectral centroid frequency 435c of the tunable receiver laser is still not equal to the central frequency 415 of the received optical communication signal, the DSP algorithm may now successfully calculate a frequency offset between the spectral centroid frequency 435c of the tunable receiver laser and the central frequency 415. The calculated frequency offset may then be used as the tracking control signal provided to the laser tracking system to further adjust the spectral centroid frequency 435c of the tunable receiver laser. Under this condition, the tunable receiver laser may scan according to the fine scanning method.

Figure 4D:
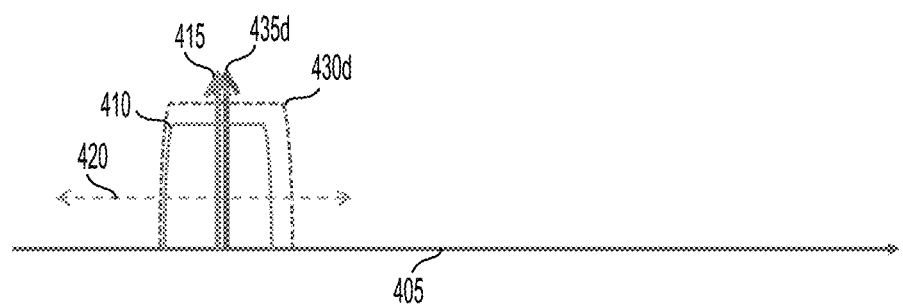

FIG. 4D illustrates the next step of the fine scanning method in which the entire envelope of the received optical communication signal 410 is included within the bandwidth of the coherent optical receiver 430d. However, at this point, the central frequency 415 of the received optical communication signal and the spectral centroid frequency 435d of the tunable receiver laser are still not coincident.

Figure 4E:
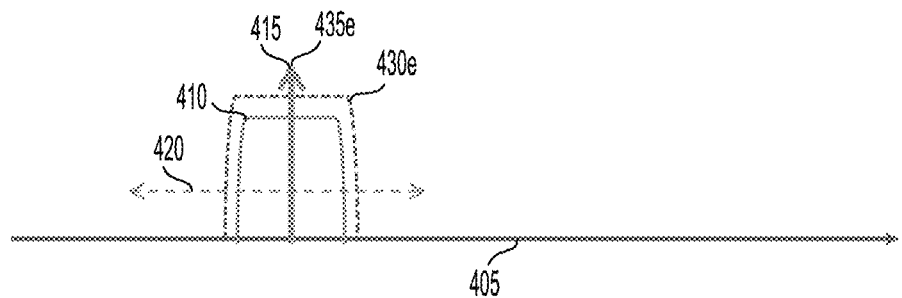

FIG. 4E illustrates a final frequency lock between the received optical communication signal and the output of the tunable receiver laser, in which the entire envelope of the received optical communication signal 410 is included within the bandwidth of the coherent optical receiver 430e, and the central frequency 415 of the received optical communication signal and the spectral centroid frequency 435e of the tunable receiver laser are coincident. At this point, variations in the central frequency 415 of the received optical communication signal can be readily tracked by the laser tracking system essentially in real time. In one non-limiting aspect, the spectral centroid frequency 435e of the tunable receiver laser may be kept within a predetermined range of the central frequency 415 of the received optical communication signal. In one non-limiting example, the predetermined range may be between about +/−2 HGz and about +/−10 GHZ—depending on the capability of the DSP hardware platform—of the central frequency 415 of the received optical communication signal.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

In most embodiments, a processor may be a physical or virtual processor. In other embodiments, a virtual processor may be spread across one or more portions of one or more physical processors. In certain embodiments, one or more of the embodiments described herein may be embodied in hardware such as a Digital Signal Processor (DSP). In certain embodiments, one or more of the embodiments herein may be executed on a DSP. One or more of the embodiments herein may be programmed into a DSP. In some embodiments, a DSP may have one or more processors and one or more memories. In certain embodiments, a DSP may have one or more computer readable storages. In many embodiments, a DSP may be a custom designed ASIC chip. In other embodiments, one or more of the embodiments stored on a computer readable medium may be loaded into a processor and executed.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within +20% of a target value in some embodiments, within +10% of a target value in some embodiments, within +5% of a target value in some embodiments, and yet within +2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

The use of headings and sections in the application is not meant to limit the disclosure; each section can apply to any aspect, embodiment, or feature of the disclosure. Only those claims which use the words "means for" are intended to be interpreted under 35 USC 112, sixth paragraph. Absent a recital of "means for" in the claims, such claims should not be construed under 35 USC 112. Limitations from the specification are not intended to be read into any claims, unless such limitations are expressly included in the claims.

Embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a computer program product embodied in one or more computer readable medium(s) having computer readable program code embodied thereon.

What is claimed is:

1. A system for compensating a frequency shift of an optical communication signal, the system comprising:
  a tunable receiver laser;

a coherent optical receiver, configured to receive the optical communication signal, wherein the coherent optical receiver is configured to demodulate the optical communication signal based on an optical output of the tunable receiver laser;
a trans-impedance amplifier configured to receive a demodulated signal from the coherent optical receiver and to generate an amplifier output, wherein the trans-impedance amplifier further comprises a power monitor configured to generate a power level based on the demodulated signal;
a laser tracking system, configured to generate a laser tuning signal configured to adjust the optical output of the tunable receiver laser, wherein the laser tracking system is configured to generate the laser tuning signal when a value of the power level is less than or equal to a threshold; and
a controller comprising a processor and a memory unit, wherein the memory unit comprises instructions that, when executed by the controller, cause the controller to:
receive the amplifier output;
calculate a frequency spectrum of the amplifier output; and
determine an offset of a frequency of the optical communication signal from a first frequency of the optical output.

2. The system of claim 1, wherein the optical communication signal is transmitted from a communication satellite.

3. The system of claim 1, wherein the tuning signal is configured to adjust the optical output in a step-wise manner.

4. The system of claim 1, wherein the laser tracking system is configured to generate the laser tuning signal based on a spectral centroid of the frequency spectrum of the amplifier output when a value of the power level is greater than a threshold.

5. The system of claim 4, wherein the tuning signal is configured to adjust the optical output within a range of about 5 GHz to about 10 GHz.

6. The system of claim 1, wherein the memory unit further comprises instructions that, when executed by the controller, cause the controller to calculate the frequency spectrum of the amplifier output based on a Fast Fourier Transform algorithm.

7. A system for compensating a frequency shift of an optical communication signal, the system comprising:
a tunable receiver laser;
a coherent optical receiver, configured to receive the optical communication signal, wherein the coherent optical receiver is configured to demodulate the optical communication signal based on an optical output of the tunable receiver laser;
a trans-impedance amplifier configured to receive a demodulated signal from the coherent optical receiver and to generate an amplifier output;
a laser tracking system, configured to generate a laser tuning signal configured to adjust the optical output of the tunable receiver laser; and
a controller comprising a processor and a memory unit, wherein the memory unit comprises instructions that, when executed by the controller, cause the controller to:
receive the amplifier output;
calculate a frequency spectrum of the amplifier output; and determine an offset of a frequency of the optical communication signal from a first frequency of the optical output, wherein the frequency shift of the received optical communication signal is a Doppler shift.

8. A system for compensating a frequency shift of an optical communication signal, the system comprising:
a tunable receiver laser;
a coherent optical receiver, configured to receive the optical communication signal, wherein the coherent optical receiver is configured to demodulate the optical communication signal based on an optical output of the tunable receiver laser;
a trans-impedance amplifier configured to receive a demodulated signal from the coherent optical receiver and to generate an amplifier output;
a laser tracking system, configured to generate a laser tuning signal configured to adjust the optical output of the tunable receiver laser; and
a controller comprising a processor and a memory unit, wherein the memory unit comprises instructions that, when executed by the controller, cause the controller to:
receive the amplifier output;
calculate a frequency spectrum of the amplifier output; and determine an offset of a frequency of the optical communication signal from a first frequency of the optical output, wherein the first frequency of the tunable receiver laser is a spectral centroid frequency.

9. A method for compensating a frequency shift of a received optical communication signal, the method comprising:
receiving, by a coherent optical receiver, the optical communication signal;
demodulating, by the coherent optical receiver, the optical communication signal based on an optical output of a tunable receiver laser, thereby generating a demodulated signal;
generating, by a power monitor, a power level based on the demodulated signal;
generating, by a trans-impedance amplifier, an amplifier output based on the demodulated signal from the coherent optical receiver;
generating, by a laser tracking system, a laser tuning signal, wherein generating the laser tuning signal comprises generating the laser tuning signal based on when a value of the power level is less than or equal to a threshold;
adjusting, by the laser tracking system, the optical output based on the laser tuning signal;
receiving, by a controller, the amplifier output;
calculating, by the controller, a frequency spectrum of the amplifier output; and
determining, by the controller, an offset of a frequency of the optical communication signal from a first frequency of the tunable receiver laser.

10. The method of claim 9, further comprising adjusting, by the laser tracking system, the optical output over a range of an optical communication band.

11. The method of claim 10, wherein adjusting the optical output over a range of an optical communication band comprises adjusting the optical output over a range of an optical communication C band, an optical communication O band, or an optical communication L band.

12. The method of claim 9, wherein adjusting, by the laser tracking system, the optical output, comprises adjusting the optical output in a step-wise manner.

13. The method of claim 9, wherein generating the laser tuning signal comprises generating a laser tuning signal based on a spectral centroid of the frequency spectrum of the amplifier output when a value of the power level is greater than a threshold.

14. The method of claim 13, wherein adjusting the first frequency of the tunable receiver laser, comprises adjusting the optical output within a range of about 5 GHz to about 10 GHz.

15. The method of claim 9, further comprising calculating, by the controller, the frequency spectrum of the amplifier output based on a Fast Fourier Transform algorithm.

16. A method for compensating a frequency shift of a received optical communication signal, the method comprising:
   receiving, by a coherent optical receiver, the optical communication signal;
   demodulating, by the coherent optical receiver, the optical communication signal based on an optical output of a tunable receiver laser, thereby generating a demodulated signal;
   generating, by a trans-impedance amplifier, an amplifier output based on the demodulated signal from the coherent optical receiver;
   generating, by a laser tracking system, a laser tuning signal;
   adjusting, by the laser tracking system, the optical output based on the laser tuning signal;
   receiving, by a controller, the amplifier output;
   calculating, by the controller, a frequency spectrum of the amplifier output; determining, by the controller, an offset of a frequency of the optical communication signal from a first frequency of the tunable receiver laser; and
   maintaining, by the laser tracking system, the first frequency of the tunable receiver laser at a predetermined value when a spectral centroid of the frequency spectrum of the amplifier output is within a predetermined range.

* * * * *